(12) United States Patent
Wei

(10) Patent No.: US 10,904,241 B2
(45) Date of Patent: *Jan. 26, 2021

(54) DIGITAL CERTIFICATE MANAGEMENT

(71) Applicant: Advanced New Technologies Co., Ltd., Grand Cayman (KY)

(72) Inventor: Yawen Wei, Hangzhou (CN)

(73) Assignee: Advanced New Technologies Co., Ltd., Grand Cayman (KY)

( * ) Notice: Subject to any disclaimer, the term of this patent is extended or adjusted under 35 U.S.C. 154(b) by 0 days.

This patent is subject to a terminal disclaimer.

(21) Appl. No.: 16/723,015

(22) Filed: Dec. 20, 2019

(65) Prior Publication Data

US 2020/0128001 A1    Apr. 23, 2020

Related U.S. Application Data

(63) Continuation of application No. 16/171,715, filed on Oct. 26, 2018.

(51) Int. Cl.
  H04L 29/06    (2006.01)
  H04L 9/32    (2006.01)
  G06F 21/33    (2013.01)
(52) U.S. Cl.
  CPC ........ H04L 63/0823 (2013.01); H04L 63/126 (2013.01); G06F 21/33 (2013.01);
  (Continued)
(58) Field of Classification Search
  CPC ............... H04L 29/06775; H04L 2463/082
  See application file for complete search history.

(56) References Cited

U.S. PATENT DOCUMENTS 6,189,097 B1   2/2001   Tycksen, Jr. et al.
6,301,658 B1   10/2001  Koehler
        (Continued)

FOREIGN PATENT DOCUMENTS

CN      101777978    7/2010
CN      102801532    11/2012
        (Continued)

OTHER PUBLICATIONS

Applied Cryptography by Bruce Schneier; Year: 1996; Publisher: John Wiley & Sons, Inc. (Year: 1996).*

(Continued)

Primary Examiner — Madhuri R Herzog
(74) Attorney, Agent, or Firm — Fish & Richardson P.C.

(57) ABSTRACT

A mapping relationship of a device ID associated with a client, a certificate ID associated with a certificate to be applied by the client during a certificate application process, and identity verification methods to be used to verify the client is stored during the certificate application process. From the client, a request for a certificate to perform a service is received, and the request includes the device ID, an identification verification requirement associated with the service, and the identity verification requirement specifies at least one identity verification method. In response to receiving the request based on the mapping relationship, a certificate ID of an existing certificate that corresponds to the received device ID and satisfies the identity verification requirement is retrieved. In response to retrieving the certificate ID, a certificate response to the client including the retrieved certificate ID is sent.

14 Claims, 10 Drawing Sheets

(52) U.S. Cl.
CPC ...... *H04L 9/3268* (2013.01); *H04L 29/06775* (2013.01); *H04L 63/0876* (2013.01); *H04L 2463/082* (2013.01)

(56) References Cited

U.S. PATENT DOCUMENTS

| | | | |
|---|---|---|---|
| 6,321,333 | B1 | 11/2001 | Murray |
| 6,430,688 | B1 | 8/2002 | Kohl et al. |
| 7,133,846 | B1 | 11/2006 | Ginter et al. |
| 2004/0233897 | A1* | 11/2004 | Yamaguchi ............. H04L 63/08 370/352 |
| 2007/0055865 | A1* | 3/2007 | Kakii .................... H04L 9/3263 713/156 |
| 2007/0300059 | A1 | 12/2007 | Yoneda |
| 2009/0178129 | A1 | 7/2009 | Cross et al. |
| 2015/0237038 | A1* | 8/2015 | Grajek ................... H04L 67/10 726/8 |
| 2015/0244706 | A1* | 8/2015 | Grajek ................. H04W 12/06 726/6 |
| 2019/0132309 | A1 | 5/2019 | Wei |

FOREIGN PATENT DOCUMENTS

| | | |
|---|---|---|
| CN | 103475485 | 12/2013 |
| CN | 104683107 | 6/2015 |
| CN | 105099680 | 11/2015 |
| CN | 105474574 | 4/2016 |
| CN | 105530266 | 4/2016 |
| EP | 1426890 | 6/2004 |
| TW | 201129050 | 8/2011 |

OTHER PUBLICATIONS

International Search Report and Written Opinion in International Application No. PCT/US2018/058213, dated Jan. 16, 2019, 15 pages.
Crosby et al., "BlockChain Technology: Beyond Bitcoin," Sutardja Center for Entrepreneurship & Technology Technical Report, Oct. 16, 2015, 35 pages.
Nakamoto, "Bitcoin: A Peer-to-Peer Electronic Cash System," www.bitcoin.org, 2005, 9 pages.
PCT International Preliminary Report on Patentability in International Application No. PCT/US2018/058213, dated Sep. 27, 2019, 6 pages.

* cited by examiner

DIGITAL CERTIFICATE MANAGEMENT

CROSS-REFERENCE TO RELATED APPLICATIONS

This application is a continuation of U.S. application Ser. No. 16/171,715, filed on Oct. 26, 2018, which claims priority to Chinese Patent Application No. 201711036776.9, filed on Oct. 30, 2017, each of which is hereby incorporated by reference in its entirety.

TECHNICAL FIELD

The present specification relates to the field of network communications technologies, and in particular, to a digital certificate application implementation method and device, and a digital certificate use implementation method and device.

BACKGROUND

The rapid development of information technologies enables the Internet to penetrate into different aspects of social life. As e-commerce, e-finance, and e-government need complete, unchangeable, and undeniable information exchanged between various parties, digital certificates are usually used to satisfy these needs.

A digital certificate is an authoritative electronic document that can be viewed as an identification card in a network environment. Digital certificates are used to prove identities of different entities (such as human beings and servers) that conduct information exchange and business activities on the Internet. Digital certificates are issued by authorities. Each digital certificate includes partial information of the subject's identity, a public key held by the subject, and a digital signature of a certificate authority.

Services using digital certificates grow continuously with development of e-commerce and e-finance services. Different services can have different security requirements. Therefore, each application (APP) installed on a device usually has a plurality of digital certificates with different credibility. How to use a small number of certificates to satisfy various requirements of different services is a problem in digital certificate development.

SUMMARY

In view of this, the present specification provides a digital certificate application implementation method, including the following: receiving a certificate application request from a client, where the certificate application request includes a device identifier (ID) of the client and an identity verification requirement of a certificate, and the identity verification requirement specifies at least one element identity verification method; issuing the certificate to the client after the client passes identity authentication performed by using the element identity verification method specified by the identity verification requirement; and storing mapping relationships between the device ID, certificate ID, and identity verification method that has been used for the certificate.

The present specification provides a computer device, including a storage device and a processor, where the storage device stores a computer program that can be run by the processor; and when running the computer program, the processor performs the steps described in the digital certificate application implementation method.

The present specification provides a computer readable storage medium, which stores a computer program, where when the computer program is run by a processor, the steps described in the digital certificate application implementation method are performed.

The present specification provides method implementations for using digital certificates, where a server maintains mapping relationships between a device ID of a client, an ID of an existing certificate of the client, and an identity verification method that has been used for the existing certificate. The method includes the following: receiving a request for using a certificate from the client, where the request for using the certificate includes a device ID of the client and an identity verification requirement of the certificate, and the identity verification requirement specifies at least one element identity verification method; searching, based on the mapping relationships, for an existing certificate ID that corresponds to the device ID and satisfies the identity verification requirement, where the existing certificate ID that satisfies the identity verification requirement is an ID of an existing certificate, where identity verification methods that have been used for the existing certificate include each element identity verification method specified by the identity verification requirement; and sending a certificate use instruction to the client, where the certificate use instruction includes the existing certificate ID that satisfies the identity verification requirement.

The present specification provides a computer device, including a storage device and a processor, where the storage device stores a computer program that can be run by the processor; and when running the computer program, the processor performs the steps described in the digital certificate use implementation method.

The present specification further provides a computer readable storage medium which stores a computer program, where when the computer program is run by a processor, the steps described in the digital certificate use implementation method are performed.

The present specification provides a digital certificate use implementation method applied to a client, and the method includes the following: sending a request for using a certificate to a server, where the request for using the certificate includes a device ID of the client and an identity verification requirement of the certificate, and the identity verification requirement specifies at least one element identity verification method, so that the server searches, based on maintained mapping relationships between the device ID of the client, an ID of an existing certificate, and an identity verification method that has been used for the existing certificate, for an existing certificate ID, where the existing certificate ID corresponds to the device ID in the request for using the certificate, and identity verification methods that have been used for the existing certificate include each element identity verification method specified by the identity verification requirement; receiving a certificate use instruction from the server, where the certificate use instruction includes an existing certificate ID that satisfies the identity verification requirement; and performing signature by using a certificate with the existing certificate ID in the certificate use instruction.

The present specification provides a computer device, including a storage device and a processor, where the storage device stores a computer program that can be run by the processor; and when running the computer program, the processor performs the steps described in the digital certificate use implementation method.

The present specification further provides a computer readable storage medium, storing a computer program, where when the computer program is run by a processor, the steps described in the digital certificate use implementation method are performed.

It can be seen from the technical solutions that, in the implementations of the present specification, when a digital certificate is applied for, the server stores the mapping relationships between the device ID of the client, certificate ID, and identity verification method that has been used for the certificate, so that a service can use the certificate without applying for a new certificate when the identity verification method that has been used for the certificate can satisfy an identity verification requirement of the service for the certificate. As such, the certificate can be reused for several services that have different service requirements. It saves device resources and reduces user operations.

In the implementations of the present specification, when a digital certificate is used, the server maintains mapping relationships between an ID of a device that the client is located on, an existing certificate ID, and an identity verification method that has been used for the existing certificate. After receiving the request for using the certificate from the client, the server searches, based on the element identity verification method specified by the identity verification requirement for the certificate and the mapping relationships, for an existing certificate ID that satisfies the identity verification requirement, and instructs the client to use the existing certificate that satisfies the identity verification requirement, so that a service can use the existing certificate of the client without applying for a new certificate when the existing certificate can satisfy an identity verification requirement of the service for the certificate. As such, the certificate can be reused for several services while satisfying service requirements. It saves device resources and reduces user operations.

BRIEF DESCRIPTION OF DRAWINGS

FIG. 6 is a diagram illustrating a hardware structure of a device that a client or a server is located on;

DESCRIPTION OF EMBODIMENTS

Figure 1:
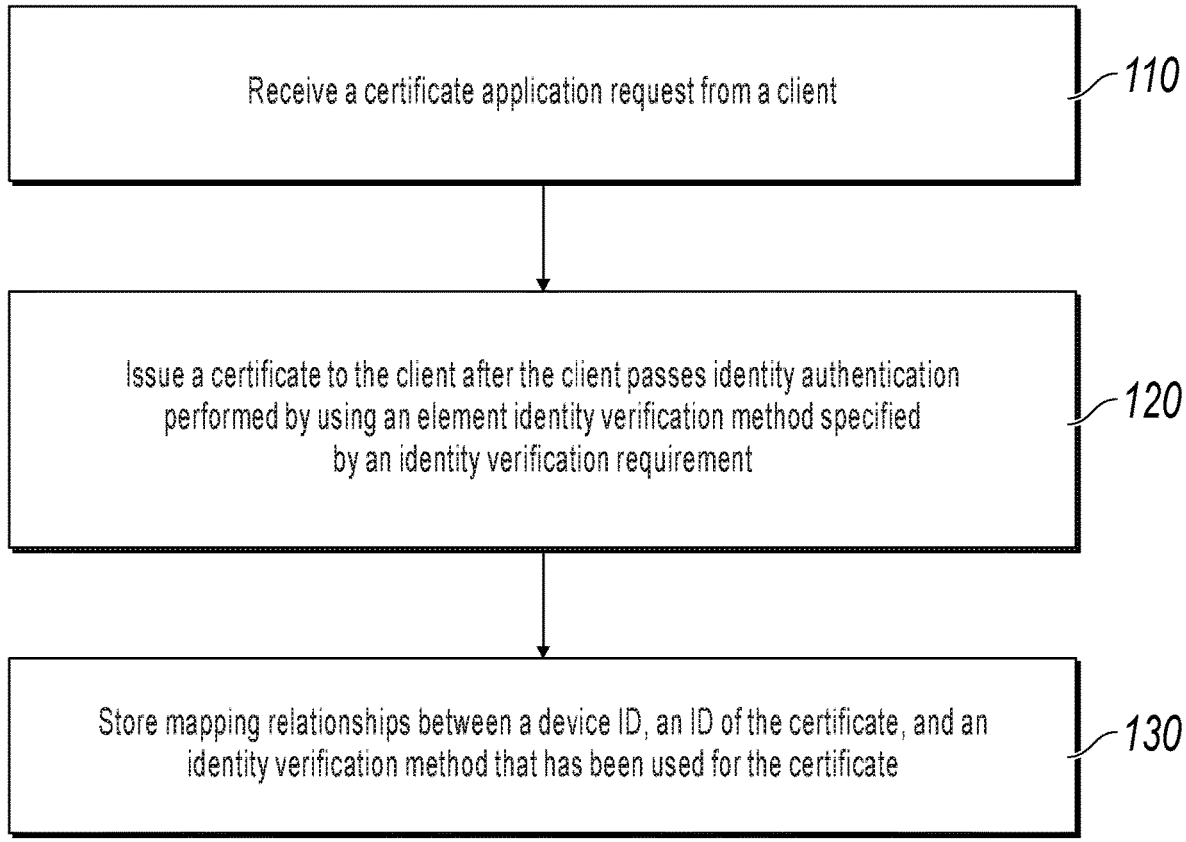
FIG. 1 is a flowchart illustrating a digital certificate application implementation method applied to a server, according to Implementation 1 of the present specification.

Credibility of a digital certificate usually depends on the identity verification method (identity authentication method) used by a user to pass identity authentication when the certificate is issued. For example, credibility of certificate B is higher than credibility of certificate A if the user needs to pass identity authentication performed by using two identity verification methods, namely password and text message authentication when applying for certificate A, but needs to pass identity authentication performed by using three identity verification methods, namely password, text message, and facial image authentication when applying for certificate B. In many application scenarios, a certificate requirement of a service usually specifies the method for passing identity verification to apply for the certificate. If a certificate that the user applies for when using the first service can satisfy a certificate requirement of the second service, the user can directly use the certificate for the second service without applying for a new certificate. It reduces the number of certificates that the user needs to apply for and clients need to maintain. In addition, if an existing certificate cannot satisfy a certificate requirement of a service, the user can upgrade the existing certificate by adding a new identity verification method based on an identity verification method that has been used for the existing certificate. As such, the existing certificate can satisfy the requirement of the service, and the user does not need to apply for a new certificate and repeat identity authentication that has been passed. It further reduces user operations and the number of certificates saved on the client.

Implementation 1 of the present specification provides a new digital certificate application implementation method. A client adds a device ID and an identity verification requirement of a certificate to a certificate application request. A server issues the certificate and stores mapping relationships between the device ID, an ID of the certificate, and an identity verification method that has been used. Based on the mapping relationships, the server uses a certificate for a service when an identity verification method that has been used for the certificate satisfies an identity verification requirement of the service. As such, the certificate can be reused for several services. It reduces the number of certificates saved on the client and also reduces certificate application operations of a user.

In Implementation 1 and Implementation 2 of the present specification, the client and the server can access each other through a network. The client can be a function module used to manage a certificate at a device layer in the operating system of a device. The client can be an application (app) or a function module in the app used to manage a certificate in the app. The client can run on various devices such as a mobile phone, a tablet, a personal computer (PC), a notebook computer, and a server. The server can run on a physical server or a logical server, or two or more physical servers or logical servers with different responsibilities cooperate with each other to implement various functions of the server in the implementations of the present specification. The type of device that the client is located on, the type of device that the server is located on, and the type and protocol of a communications network between the client and the server are not limited in Implementation 1 and Implementation 2 of the present specification.

In Implementation 1 and Implementation 2 of the present specification, an identity verification requirement of a certificate specifies one or more identity verification methods. For distinction, these identity verification methods are referred to as element identity verification methods below. For example, if an identity verification requirement of a certificate is a text message and a facial image, the certificate has two element identity verification methods: the text message and the facial image. The element identity verification methods reflect credibility of the certificate. Identity authentication performed by using each element identity verification method needs to be passed when the certificate is applied for. When element identity verification methods for the first certificate include all element identity verification methods for the second certificate, the first certificate satisfies an identity verification requirement of the second certificate. Credibility of the first certificate is at least not lower than credibility of the second certificate, and the efficiency of using the first certificate instead of the second certificate to perform digital signature is at least not lower than the efficiency of using the second certificate to perform digital signature.

In some application scenarios of Implementation 1 and Implementation 2 of the present specification, the identity verification requirement of the certificate can include one or more identity verification method sets. Each identity verification method set specifies one or more element identity verification methods. The identity verification requirement of the certificate can include all element identity verification methods in any identity verification method set. That is, the identity verification requirement is satisfied when identity authentication performed by using each element identity verification method in any identity verification method set of the identity verification requirement is passed. For example, if an identity verification requirement of a certificate includes two identity verification method sets, the first identity verification method set has three element identity verification methods (an account password, a text message, and a facial image), and the second identity verification method set has two element identity verification methods (a facial image and a fingerprint), the identity verification requirement of the certificate is satisfied when the user passes identity authentication performed by using the account password, the text message, and the facial image, or passes identity authentication performed by using the facial image and the fingerprint. However, if the user passes only identity authentication performed by using the account password and the facial image, the identity verification requirement of the certificate is not satisfied because a combination of these two identity verification methods is different from the element identity verification methods specified for the certificate.

FIG. 1 shows a procedure of a digital certificate application implementation method in Implementation 1 of the present specification, and the method is applied to a server.

Step 110: Receive a certificate application request from a client.

When applying for a new digital certificate, an ID of a device that the client is located on and an identity verification requirement of the certificate can be encapsulated into a certificate application request, and the request is sent to the server to apply for the certificate. The identity verification requirement of the certificate is usually determined by a service to be performed on the device that the client is located on. The device ID can be any information that can uniquely represent the device, such as an international mobile equipment identity (IMEI), a universally unique ID (UUID), or a Media Access Control (MAC) address.

The server extracts the device ID of the client and the identity verification requirement of the certificate from the certificate application request, and instructs, based on the identity verification requirement, the client to perform identity authentication.

Step 120: Issue a certificate to the client after the client passes identity authentication performed by using an element identity verification method specified by an identity verification requirement.

On the client, the user performs identity authentication based on each element identity verification method specified by the identity verification requirement of the certificate. After the user successfully completes all the identity authentication processes, the server can learn that the client passes the identity authentication performed by using each element identity verification method and satisfies the identity verification requirement. Then the server issues the certificate to the client.

In step 110 and step 120, specific processes in which the server instructs the client to perform the identity authentication, the client performs the identity authentication, the server learns that the client passes the authentication, and the server issues the certificate can be implemented by using different interactive procedures, such as the various interactive procedures for certificate application process in the existing technology, based on implementations of the server and the client in practical scenarios and certificate application security requirements. Details are omitted for simplicity.

Step 130: Store mapping relationships between a device ID of the client, an ID of the issued certificate, and an identity verification method that has been used for the issued certificate.

The server stores the mapping relationships between the device ID of the client receiving the issued certificate, the ID of the issued certificate, and the identity verification method that has been used for the issued certificate (including each element identity verification method that has been used for passing identity authentication by the user on the client in a certificate application process) in an accessible storage location. The ID of the certificate is information that can uniquely represent the certificate on the server, such as a serial number of the certificate or an index of the certificate in a certificate database on the server.

In some application scenarios, different users may use the same device to perform services, or the same user can perform services on the same device with different accounts. In these application scenarios, the client encapsulates a user ID, the ID of the device that the client is located on, and the identity verification requirement of the certificate that is applied for, into the certificate application request. The server stores mapping relationships between the user ID, the ID of the device that the client is located on, the ID of the issued certificate, and the identity verification method that has been used for the issued certificate. The user ID is information that can uniquely represent a user account on the server, such as a name of the user account or the identification number of the user account on the server. In these application scenarios, the client needs to provide the user ID and the device ID, so that the server can identify, in the stored mapping relationships, a certificate that is issued to client with the same device ID and that belongs to a user with the user ID (that is, an existing certificate of the client).

It can be seen that, in Implementation 1 of the present specification, the server extracts the device ID and the identity verification requirement of the certificate from the certificate application request, issues the certificate after the client passes the identity authentication performed by using each element identity verification method, and stores the mapping relationships between the device ID, the ID of the certificate, and the identity verification method that has been used. The mapping relationships allow a certificate to be reused for a service when an identity verification method that has been used for the certificate satisfies an identity verification requirement of the service for a certificate. While satisfying the requirement of the service, it reduces the number of certificates, saves device resources, and reduces user operations.

Implementation 2 of the present specification provides a new digital certificate use implementation method. A server searches, based on an element identity verification method specified by an identity verification requirement of a certificate that is sent by client, existing certificates of a device that the client is located on for an existing certificate ID that satisfies the identity verification requirement, and instructs the client to use the existing certificate that satisfies the identity verification requirement. As such, the existing certificate can be reused for several services while satisfying service requirements. It reduces the number of certificates saved on the client and also reduces certificate application operations of a user.

In Implementation 2 of the present specification, the server maintains mapping relationships between an ID of the device that the client is located on, an ID of an existing certificate of the client, and an identity verification method that has been used for the existing certificate. The existing certificate is a certificate issued by the server to the client. An identity verification method that has been used for a certain existing certificate includes each identity verification method used by the user to pass identity authentication when applying for and using the certificate.

Similar to Implementation 1, when different users use the same device to perform services, or the same user uses different accounts to perform services on the same device, the server maintains mapping relationships between an ID of a user using the client, the ID of the device that the client is located on, the ID of the existing certificate of the client, and the identity verification method that has been used for the existing certificate. In these application scenarios, the server uses both the user ID and the device ID to search for an ID of a corresponding existing certificate.

In the present implementation, for descriptions of the device ID, the ID of the existing certificate (a certificate ID), the identity verification requirement, and the element identity verification method, refer to Implementation 1. Details are omitted for simplicity.

Figure 2:
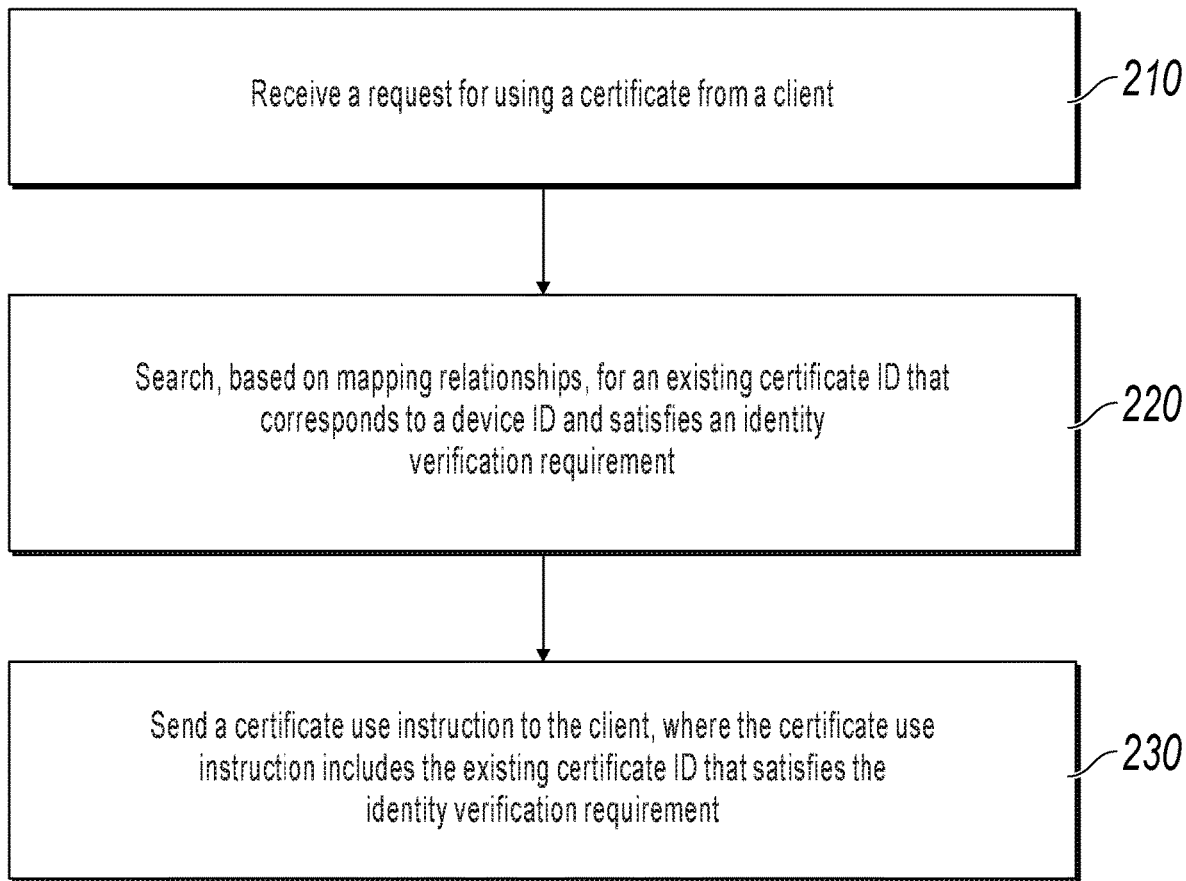
FIG. 2 is a flowchart illustrating a digital certificate use implementation method applied to a server, according to Implementation 2 of the present specification.
Figure 3:
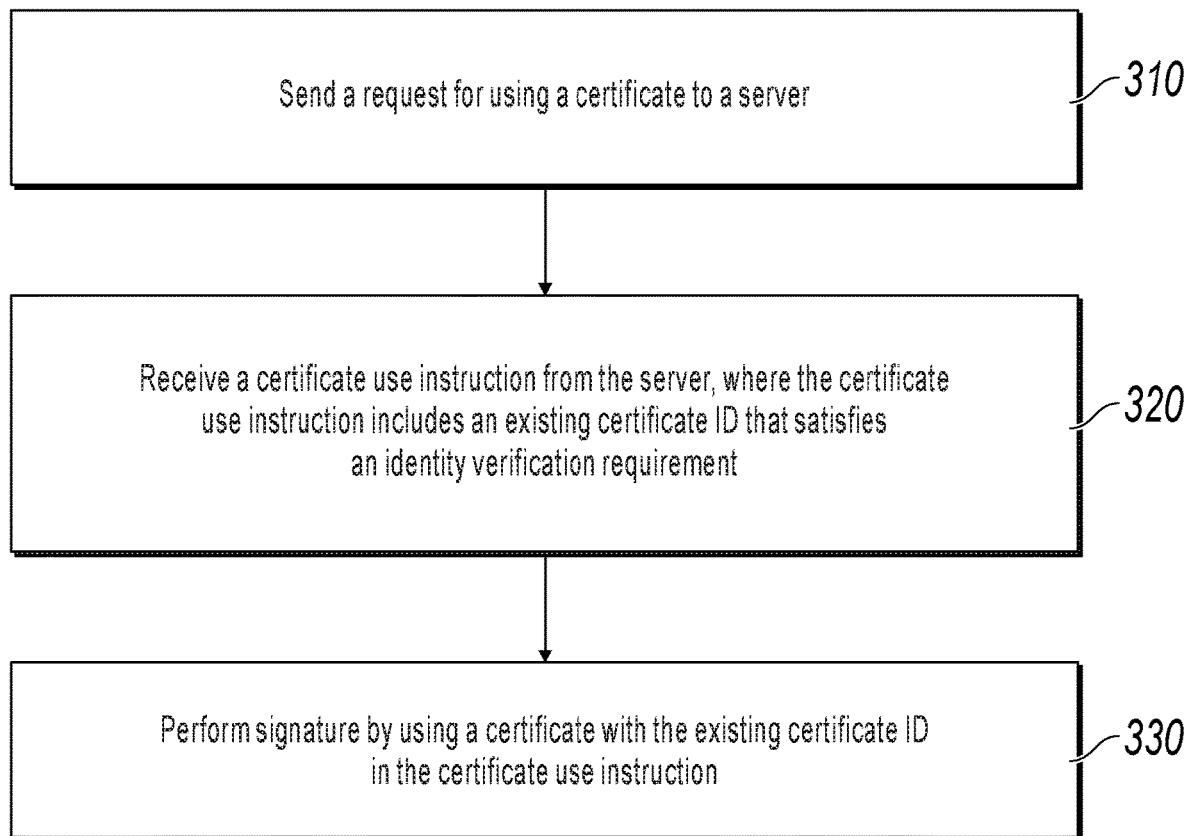
FIG. 3 is a flowchart illustrating a digital certificate use implementation method applied to a client, according to Implementation 2 of the present specification.

FIG. 2 shows a procedure of a digital certificate use implementation method running on the server in Implementation 2 of the present specification. FIG. 3 shows a procedure of a digital certificate use implementation method running on the client in Implementation 2 of the present specification.

Step 310: A client sends a request for using a certificate to a server.

Step 210: The server receives the request for using the certificate from the client.

When the device that the client is located on performs a certain service and needs to use a digital certificate, the client encapsulates the ID of the device that the client is located on (or the user ID and the device ID) and an identity verification requirement of the service for the certificate into the request for using the certificate, and sends the request for using the certificate to the server.

Step 220: The server searches, based on maintained mapping relationships, for an ID of an existing certificate that corresponds to a device ID and satisfies an identity verification requirement.

The server extracts the device ID (or the user ID and the device ID) and the identity verification requirement of the certificate from the received request for using the certificate, and searches the locally maintained mapping relationships for an ID of each existing certificate corresponding to the device ID (or the user ID and the device ID) in the request for using the certificate. If used identity verification methods corresponding to an ID of a certain existing certificate include all element identity verification methods specified by the identity verification requirement carried in the request for using the certificate, the existing certificate with the ID satisfies the identity verification requirement.

Step 230: The server sends a certificate use instruction to the client, where the certificate use instruction includes the ID of the existing certificate that satisfies the identity verification requirement.

Step 320: The client receives the certificate use instruction from the server.

Step 330: The client performs signature by using a certificate with the ID of the existing certificate in the certificate use instruction.

If the server identifies the ID of the existing certificate that satisfies the identity verification requirement in the request for using the certificate, the server sends the certificate use instruction to the client. The certificate use instruction carries the ID of the existing certificate that satisfies the identity verification requirement. After receiving the certificate use instruction, the client performs signature by using the existing certificate specified by the server in the certificate use instruction.

If the server identifies more than one existing certificate ID that satisfies the identity verification requirement, the server can add one of them to the certificate use instruction and send the certificate use instruction to the client, or the server can add IDs of some or all existing certificates to the certificate use instruction and send the certificate use instruction to the client. The client selects an ID of one existing certificate and performs signature by using the existing certificate with the ID.

If all existing certificates whose IDs are corresponding to the device ID (or the use ID and the device ID) in the request for using the certificate do not satisfy the identity verification requirement, the server searches the IDs of the existing certificates corresponding to the device ID (or the user ID and the device ID) for an ID of an existing certificate, where at least one identity verification method that has been used for the existing certificate is the same as an element identity verification method specified by the identity verification requirement in the request for using the certificate. If there is an ID of such an existing certificate, the server determines an ID or IDs of one or more such existing certificates as an upgradable certificate ID or upgradable certificate IDs. One or more used identity verification methods corresponding to the upgradable certificate ID are the same as element identity verification methods specified by the identity verification requirement. If the server cannot identify an upgradable certificate ID, that is, when used identity verification methods corresponding to IDs of all existing certificates are different from each element identity verification method specified by the identity verification requirement, the server can instruct the client to perform a new certificate application procedure. (For details, refer to Implementation 1.)

When determining the upgradable certificate ID, the server can use an existing certificate ID that corresponds to the device ID (or the user ID and the device ID) in the request for using the certificate and has the minimum number of to-be-upgraded identity verification methods as the upgradable certificate ID. If the identity verification requirement includes two or more identity verification method sets, the server can traverse each identity verification method set to identify the ID of the existing certificate that has the minimum number of to-be-upgraded identity verification methods. In an implementation, the server can use a greedy algorithm, an A* algorithm (an algorithm for identifying the optimal solution), or a top-k algorithm (an algorithm for identifying the most suitable k target objects) to select the ID of the existing certificate that has the minimum number of to-be-upgraded identity verification methods, and determine at least one of the ID of the existing certificate as the upgradable certificate ID.

The server compares the element identity verification method specified by the identity verification requirement in the request for using the certificate with a used identity verification method corresponding to each upgradable certificate ID, and uses all element identity verification methods different from the used identity verification method as to-be-upgraded identity verification methods of the upgradable certificate. That is, a to-be-upgraded identity verification method is needed for satisfying the identity verification requirement but has not been used for a certain upgradable certificate.

The server sends the to-be-upgraded identity verification method corresponding to the upgradable certificate ID to the client. If there are more than one upgradable certificate IDs, the server can send a to-be-upgraded identity verification method corresponding to one upgradable certificate ID to the client. Or the server can send at least two upgradable certificate IDs and to-be-upgraded identity verification methods corresponding to the at least two upgradable certificate IDs to the client. When receiving more than one upgradable certificate ID from the server, the client can select one upgradable certificate ID and perform identity authentication by using each to-be-upgraded identity verification method corresponding to the selected upgradable certificate ID. On the client, a service running function module or the user can select the upgradable certificate ID, which is not limited in the present implementation.

In an example, when an ID of an existing certificate corresponding to the device ID (or the user ID and the device ID) does not satisfy the identity verification requirement, and the server identifies an upgradable certificate ID, the server sends a notification indicating that an existing certificate is upgradable to the client. The client receives the notification indicating that the existing certificate is upgradable, notifies the user that the existing certificate can be upgraded through additional identity authentication, and asks the user whether to perform the upgrade. If the client receives a confirmation operation from the user, the client sends an acknowledgement for upgrading the existing certificate to the server. If the client receives a rejection operation from the user, the client starts a new certificate application procedure. After receiving the acknowledgement for upgrading the existing certificate from the client, the server sends a to-be-upgraded identity verification method corresponding to an upgradable certificate ID to the client.

After receiving the to-be-upgraded identity verification method corresponding to the at least one upgradable certificate ID, the client performs identity authentication by using a to-be-upgraded identity verification method corresponding to one upgradable certificate ID. After the client passes identity authentication performed by using each to-be-upgraded identity verification method corresponding to the upgradable certificate ID, the upgradable certificate ID satisfies the identity verification requirement in the request for using the certificate. The server encapsulates the upgradable certificate ID into the certificate use instruction, and sends the certificate use instruction to the client. The client receives the certificate use instruction, and performs signature by using a certificate with the upgradable certificate ID in the certificate use instruction.

As such, when an existing certificate does not satisfy an identity verification requirement of a certain service, if an identity verification method that has been used for the existing certificate is the same as an element identity verification method specified by the identity verification requirement, the existing certificate can be upgraded by instructing the user to perform identity authentication using a to-be-upgraded identity verification method, so that the existing certificate satisfies the identity verification requirement of the service. As such, the user only needs to perform identity authentication using some element identity verification methods instead of applying for a new certificate. It reduces user operations and improves efficiency for the user.

Similar to Implementation 1, in the present implementation, specific processes in which the client performs identity authentication, the server learns that the client passes the authentication, and the server sends the certification use instruction can be implemented by using different interactive procedures, for example, various interactive procedures in a certificate use process in the existing technology, which is based on implementations of the server and the client in an actual application scenario and a certificate application security requirement. Details are omitted for simplicity.

After the client passes identity authentication performed by using each to-be-upgraded identity verification method corresponding to a certain upgradable certificate ID, the server updates, based on the to-be-upgraded identity verification method that has been used for identity authentication that the client passes, a used identity verification method corresponding to the upgradable certificate ID in the maintained mapping relationships, that is, adds all to-be-upgraded identity verification methods that has been used for identity authentication that the client passes to the used identity verification method corresponding to the upgradable certificate ID.

It can be seen that, in Implementation 2 of the present specification, the server maintains the mapping relationships between the ID of the device that the client is located on, the ID of the existing certificate, and the identity verification method that has been used for the existing certificate. The server searches, based on the element identity verification method specified by the identity verification requirement of the certificate that is sent by the client, the existing certificates of the device that the client is located on for the ID of the existing certificate that satisfies the identity verification requirement, and instructs the client to use the existing certificate that satisfies the identity verification requirement. As such, a service can use an existing certificate of the client without applying for a new certificate when the existing certificate can satisfy an identity verification requirement of the service for a certificate. It reduces the number of certificates saved on the client and also reduces certificate application operations of a user.

The specific implementations of the present specification are described above. Other implementations fall within the scope of the claims. In some cases, actions or steps described in the claims can be performed in an order different from the orders in the implementations, and expecting results can still be achieved. In addition, the processes illustrated in the accompanying drawings are not necessarily performed in a particular order or a consecutive order to achieve the expected results. In some implementations, multi-tasking and parallel processing are also possible or can be beneficial.

In an application example of the present specification, a server of a third-party payment platform includes a certificate management server and an identity verification server. A client app of the third-party payment platform runs on a user device, and the app includes a certificate software development kit (SDK) module. In the present application example, a new certificate is issued by a CA server of a certificate authority (CA) responsible for issuing, managing, and revoking digital certificates.

Figure 4:
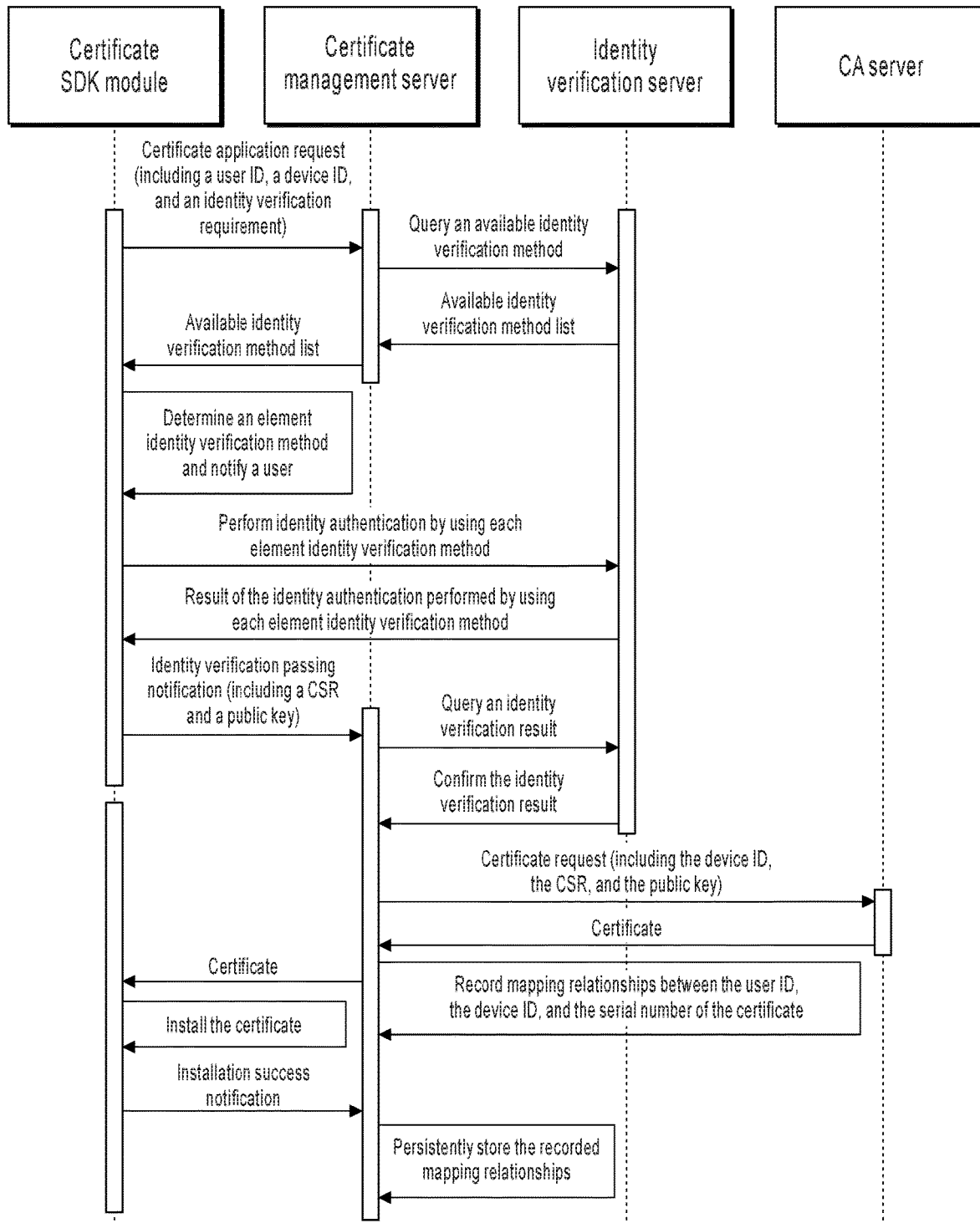
FIG. 4 is a flowchart illustrating interaction between a certificate SDK module, a certificate management server, an identity verification server, and a CA server, when a digital certificate is applied for in an application example of the present specification.

FIG. 4 shows a procedure of interaction between the certificate SDK module, the certificate management server, the identity verification server, and the CA server, when a user applies for a certificate on the client app.

The certificate SDK module encapsulates a user ID, an ID of a device that the client is located on, and an identity verification requirement of a service for a certificate into a certificate application request, and sends the certificate application request to the certificate management server.

The certificate management server extracts an element identity verification method specified by the identity verification requirement of the certificate in the certificate application request, and queries an identity verification method available to the user and the device from the identity verification server. If an available identity verification method returned by the identity verification server includes the element identity verification method specified by the identity verification requirement, the certificate management server returns an available identity verification method list to the certificate SDK module. Otherwise, the certificate management server notifies the SDK module that the current certificate application is not supported.

The certificate SDK module receives the available identity verification method list. If the identity verification requirement includes more than one identity verification method set, the certificate SDK module selects an element identity verification method in one identity verification method set, based on the available identity verification method list, as the element identity verification method specified by the identity verification requirement, and notifies the user that identity authentication needs to be performed by using which identity verification methods for applying for the certificate.

The certificate SDK module and the identity verification server perform, through user operations, identity authentication by using each element identity verification method specified by the identity verification requirement.

After the user passes the identity authentication performed by using each element identity verification method, the certificate SDK module sends an identity verification passing notification to the certificate management server. The certificate SDK module adds certificate application information to the identity verification passing notification. The certificate application information includes various types of information that needs to be provided for applying for the certificate, such as a certificate signing request (CSR) and a public key.

The certificate management server queries a result of the identity authentication performed by the user using the element identity verification method from the identity verification server, and submits a certificate request to the CA server after receiving an acknowledgment from the identity verification server. The certificate request carries the CSR, the public key, an ID of a device that the certificate SDK module is located on, etc.

After receiving the certificate issued by the CA server, the certificate management server records mapping relationships between the user ID, the device ID, a serial number of an existing certificate (a certificate ID of an issued certificate), and an element identity verification method of the existing certificate, and sends the certificate to the certificate SDK module.

The certificate SDK module installs the received certificate, and sends a certificate installation success notification to the certificate management server after the installation succeeds. After receiving the certificate installation success notification, the certificate management server persistently stores the recoded mapping relationships.

Figure 5:
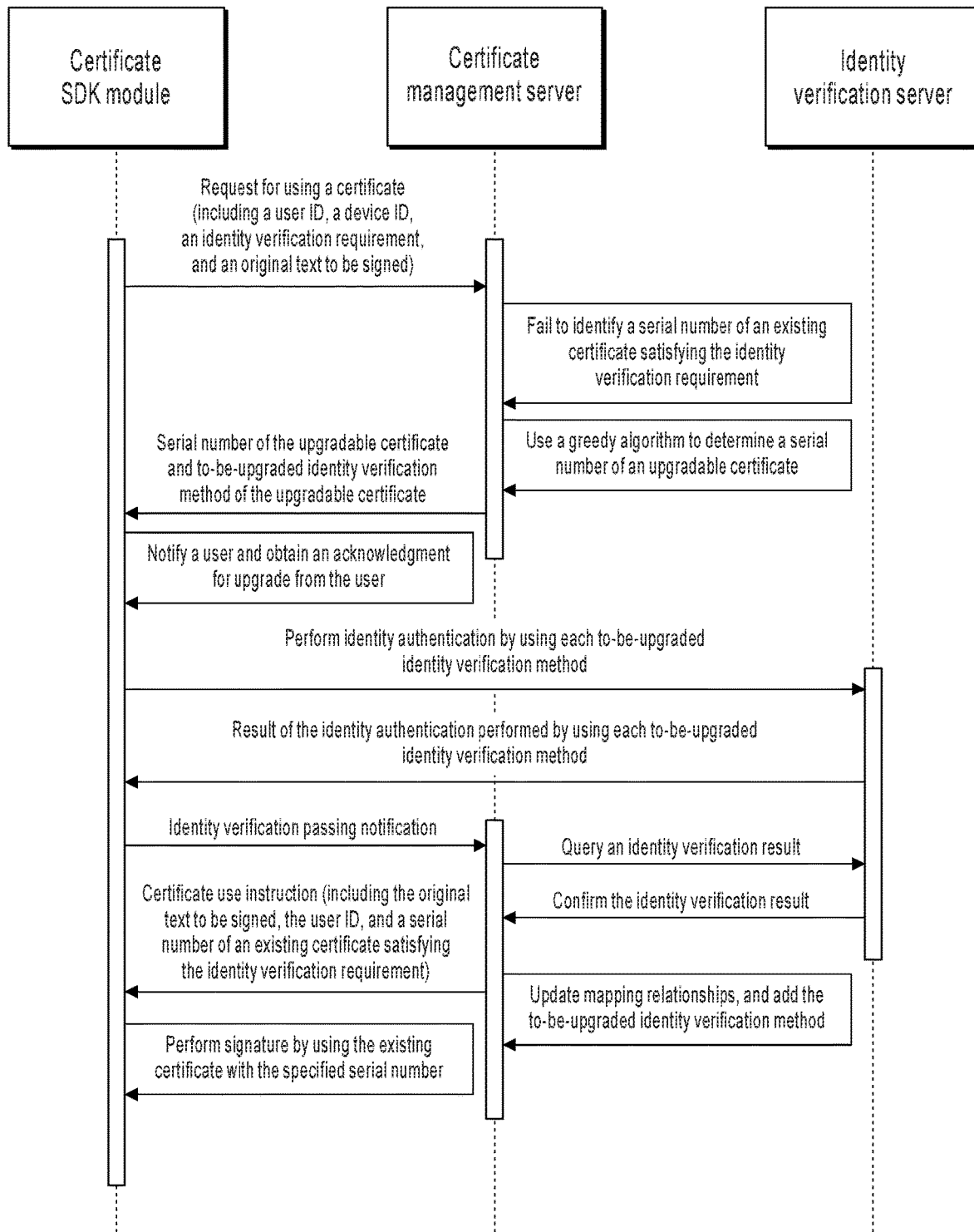
FIG. 5 is a flowchart illustrating interaction between a certificate SDK module, a certificate management server, and an identity verification server when a digital certificate is used in an application example of the present specification.

FIG. 5 shows a procedure of interaction between the certificate SDK module, the certificate management server, and the identity verification server, when a user runs a certain service on the client app and the service needs to use a certificate.

The user uses the client app to apply to the certificate SDK module for a digital certificate signature, and sends a user ID, an identity verification requirement of a certificate, and an original text to be signed to the certificate SDK module. The identity verification requirement of the certificate can include two or more identity verification method sets. Each identity verification method set can specify one or more element identity verification methods.

The identity verification requirement of the certificate can be translated by using a logical expression of an identity verification method. For example, the expression [SMS && FACE||IDCARD && EMAIL && FINGERPRINT] indicates that the identity verification requirement includes two identity verification method sets, element identity verification methods in the first identity verification method set are a text message and a facial image, and element identity verification methods in the second identity verification method set are an identification card, an email, and a fingerprint.

The certificate SDK module sends a request for using the certificate to the certificate management server. The request for using the certificate carries the user ID, the device ID, the identity verification requirement of the certificate, and the original text to be signed.

The certificate management server queries the maintained mapping relationships to check whether there is a serial number of an existing certificate that corresponds to the user ID and the device ID and satisfies the identity verification requirement. For an identity verification requirement including a plurality of identity verification method sets, when used identity verification methods corresponding to a serial number of an existing certificate include each element identity verification method specified by any identity verification method set, the serial number of the existing certificate satisfies the identity verification requirement. The certificate management server coverts the identity verification requirement to executable decision logic by using a dynamic script language to check whether the serial number of the existing certificate satisfies the identity verification requirement.

If there is a serial number of an existing certificate that satisfies the identity verification requirement, the certificate management server sends a certificate use instruction to the certificate SDK module (not shown in FIG. 5). The certificate use instruction carries the serial number of the existing certificate that satisfies the identity verification requirement. The certificate SDK module performs digital signature by using the existing certificate with the serial number specified by the certificate management server in the certificate use instruction (not shown in FIG. 5).

When there is no serial number of an existing certificate that satisfies the identity verification requirement, the certificate management server searches serial numbers of existing certificates, where at least one identity verification method that has been used for the existing certificates is the same as one element identity verification method specified by the identity verification requirement. Then the certificate management server uses a greedy algorithm to select a serial number of an existing certificate that has the minimum number of to-be-upgraded identity verification methods from these serial numbers of the existing certificates as a serial number of an upgradable certificate (an upgradable certificate ID). The certificate management server sends the serial number of the upgradable certificate and a to-be-upgraded identity verification method of the upgradable certificate to the certificate SDK module.

The certificate SDK module notifies the user that an existing certificate can be used to perform signature and there is no need to install a new certificate, but extra identity authentication needs to be performed to upgrade the certificate. After receiving a confirmation operation from the user, the certificate SDK module starts an identity authentication process. The certificate SDK module and the identity verification server perform, through user operations, identity authentication by using each to-be-upgraded identity verification method corresponding to a serial number of an upgradable certificate.

After the user passes the identity authentication performed by using each to-be-upgraded identity verification method, the certificate SDK module sends an identity verification passing notification to the certificate management server.

The certificate management server queries a result of the identity authentication performed by the user using the to-be-upgraded identity verification method from the identity verification server. After receiving an acknowledgement from the identity verification server, the certificate management server updates the maintained mapping relationships, that is, adds the to-be-upgraded identity verification method that the user passes to the succeeded identity verification method corresponding to the serial number of the existing certificate that corresponds to the user ID and the device ID in the mapping relationships.

The certificate management server sends a certificate use instruction to the client. The certificate use instruction carries signature content generated by the server, the original text to be signed, the user ID, the serial number of the existing certificate that satisfies the identity verification requirement, a server certificate signature, etc.

After receiving the certificate use instruction, the SDK module uses the existing certificate with the specified serial number to sign the signature content.

Figure 6:
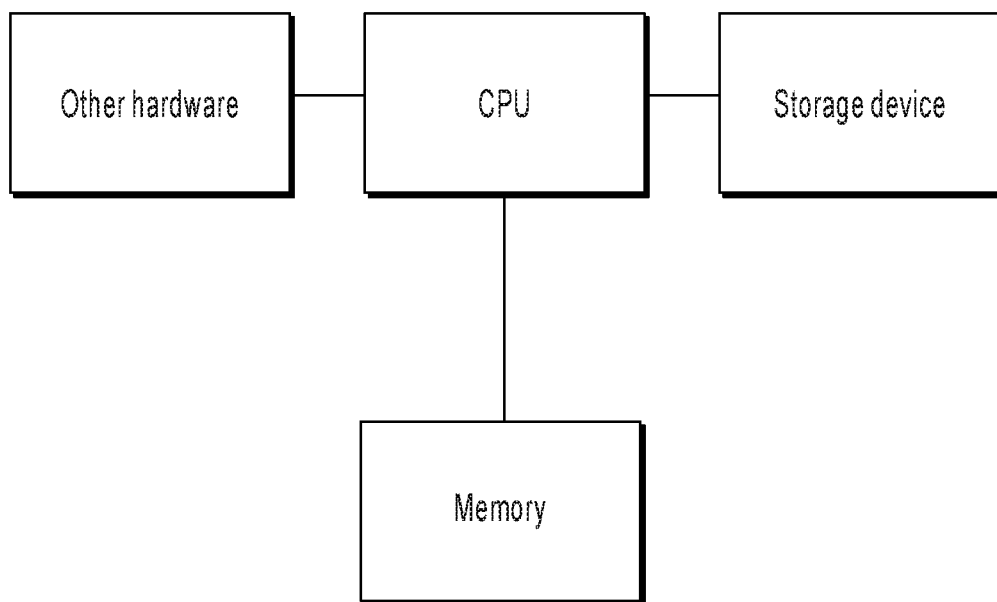

Corresponding to the procedure implementations, implementations of the present specification further provide a digital certificate application implementation device, a digital certificate use implementation device applied to a server, and a digital certificate use implementation device applied to a client. All these three devices can be implemented by using software, hardware, or a combination of software and hardware. Using software implementation as an example, a logical device is formed as follows: A central processing unit (CPU) of a device that the client or the server is located on reads a corresponding computer program instruction to a memory for running. From the hardware perspective, a device that the digital certificate application implementation device or the digital certificate use implementation device is located on further includes other hardware such as a chip receiving and transmitting radio signals and/or other hardware such as a board or card implementing a network communication function in addition to a CPU, a memory, and a storage device shown in FIG. 6.

Figure 7:
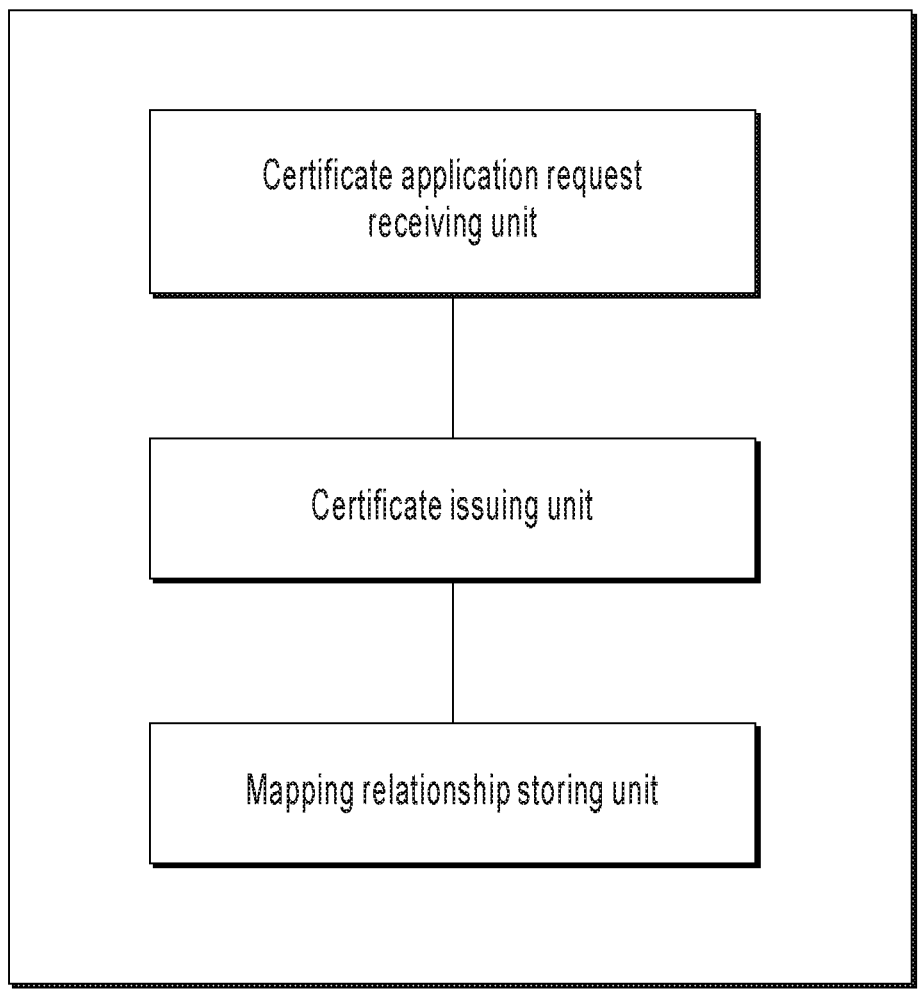
FIG. 7 is a diagram illustrating a logical structure of a digital certificate application implementation device applied to a server, according to an implementation of the present specification.

FIG. 7 shows a digital certificate application implementation device according to an implementation of the present specification. The device is applied to a server and includes a certificate application request receiving unit, a certificate issuing unit, and a mapping relationship storing unit. The certificate application request receiving unit is configured to receive a certificate application request from a client, where the certificate application request includes a device ID of the client and an identity verification requirement of the certificate, and the identity verification requirement specifies at least one element identity verification method. The certificate issuing unit is configured to issue the certificate to the client after the client passes identity authentication performed by using the element identity verification method specified by the identity verification requirement. The mapping relationship storing unit is configured to store mapping relationships between the device ID, an ID of the certificate, and an identity verification method that has been used for the certificate.

Optionally, the identity verification requirement includes at least one identity verification method set. Each identity verification method set specifies at least one element identity verification method. The element identity verification methods specified by the identity verification requirement include all element identity verification methods specified by one identity verification method set in the identity verification requirement.

Optionally, the certificate application request further includes a user ID, mapping relationships between the device ID, certificate ID, and identity verification method, and mapping relationships between the stored user ID, the device ID, the certificate ID, and the identity verification method.

Figure 8:
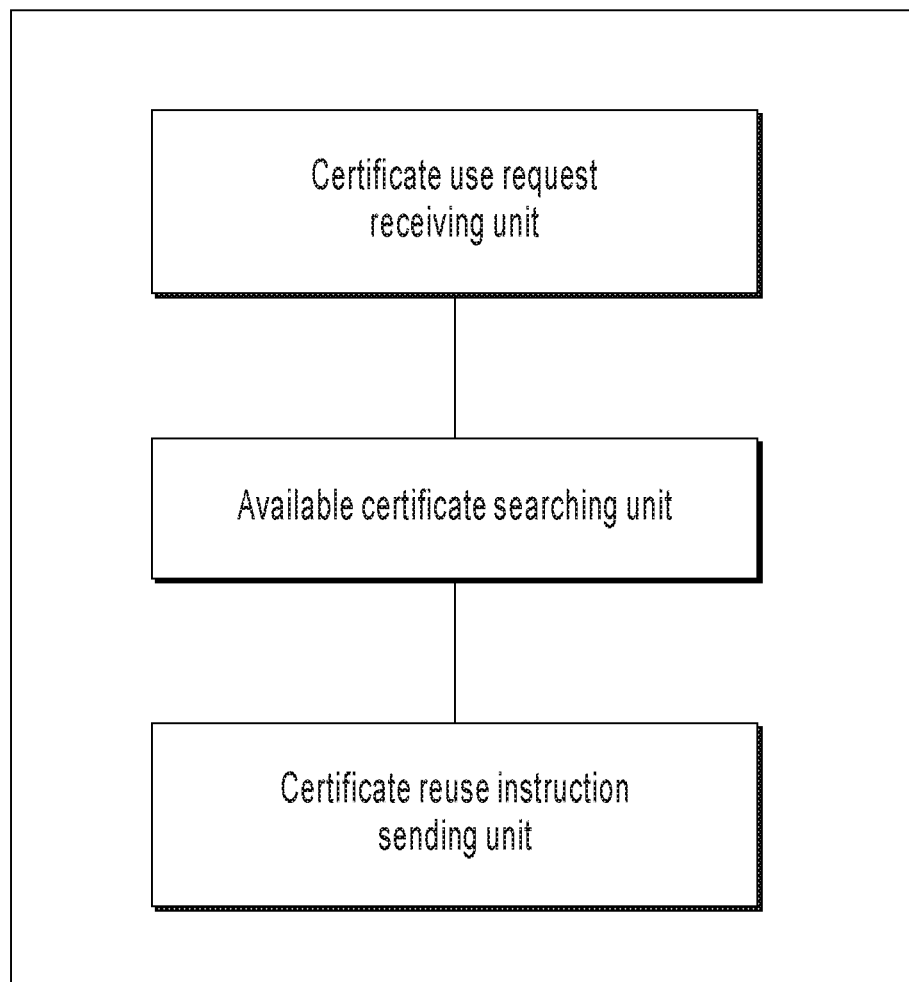
FIG. 8 is a diagram illustrating a logical structure of a digital certificate use implementation device applied to a server, according to an implementation of the present specification.

FIG. 8 shows a digital certificate use implementation device according to an implementation of the present specification. A server maintains mapping relationships between a device ID of client, an ID of an existing certificate of the client, and a passed identity verification method of the existing certificate. The device includes a certificate use request receiving unit, an available certificate searching unit, and a certificate reuse instruction sending unit. The certificate use request receiving unit is configured to receive a request for using a certificate from the client, where the request for using the certificate includes the device ID of the client and an identity verification requirement of the certificate, and the identity verification requirement specifies at least one element identity verification method. The available certificate searching unit is configured to search, based on the mapping relationships, for an ID of an existing certificate that corresponds to the device ID and satisfies the identity verification requirement. The ID of the existing certificate that satisfies the identity verification requirement is an ID of an existing certificate, where identity verification methods that have been used for the existing certificate include each element identity verification method specified by the identity verification requirement. The certificate reuse instruction sending unit is configured to send a certificate use instruction to the client, where the certificate use instruction includes the ID of the existing certificate that satisfies the identity verification requirement.

In an implementation, the device further includes an upgradable certificate ID unit, a to-be-upgraded identity verification method sending unit, and an upgraded certificate use instruction sending unit. The upgradable certificate ID unit is configured to determine an ID of at least one existing certificate corresponding to the device ID as an upgradable certificate ID, when an ID of an existing certificate corresponding to the device ID does not satisfy the identity verification requirement, where at least one used identity verification method corresponding to the upgradable certificate ID is the same as an element identity verification method. The to-be-upgraded identity verification method sending unit is configured to send to-be-upgraded identity verification methods corresponding to the upgradable certificate ID to the client, where the to-be-upgraded identity verification methods are all element identity verification methods different from the used identity verification method corresponding to the upgradable certificate ID. The upgraded certificate use instruction sending unit is configured to send a certificate use instruction to the client after the client passes identity authentication performed by using each to-be-upgraded identity verification method corresponding to an upgradable certificate ID, where the certificate use instruction includes the upgradable certificate ID that satisfies the identity verification requirement.

In the implementation, the device can further include a mapping relationship updating unit, configured to update, based on the to-be-upgraded identity verification method that has been used for identity authentication that the client passes, the used identity verification method corresponding to the upgradable certificate ID that satisfies the identity verification requirement in the maintained mapping relationships.

In the implementation, the upgradable certificate ID unit is specifically configured to determine an ID of at least one existing certificate that corresponds to the device ID and has the minimum number of to-be-upgraded identity verification methods as the upgradable certificate ID, when the ID of the existing certificate corresponding to the device ID does not satisfy the identity verification requirement.

In the implementation, the upgradable certificate ID unit determines an ID of at least one existing certificate that corresponds to the device ID and has the minimum number of to-be-upgraded identity verification methods, including using a greedy algorithm, an A* algorithm, or a top-k algorithm to select the ID of the existing certificate that has the minimum number of to-be-upgraded identity verification methods.

In the implementation, the upgradable certificate ID unit is specifically configured to send a notification indicating that an existing certificate is upgradable to the client when the existing certificate ID corresponding to the device ID does not satisfy the identity verification requirement and there is an upgradable certificate ID corresponding to the device ID, and determine at least one existing certificate ID corresponding to the device ID as the upgradable certificate ID.

In the implementation, the to-be-upgraded identity verification sending unit is specifically configured to send at least two upgradable certificate IDs and to-be-upgraded identity verification methods corresponding to the at least two upgradable certificate IDs, so that the client selects one upgradable certificate ID from the at least two upgradable certificate IDs, and performs identity authentication by using a to-be-upgraded identity verification method corresponding to the selected upgradable certificate ID.

In the implementation, the mapping relationships include mapping relationships between the user ID, device ID of the client, the ID of the existing certificate of the client, and the identity verification method that has been used for the existing certificate. The request for using the certificate further includes the user ID. The existing certificate ID corresponding to the device ID includes an existing certificate ID corresponding to the user ID and the device ID.

Optionally, the identity verification requirement includes at least one identity verification method set. Each identity verification method set specifies at least one element identity verification method. The at least one element identity verification method specified by the identity verification requirement includes all element identity verification methods specified by one identity verification method set in the identity verification requirement.

Figure 9:
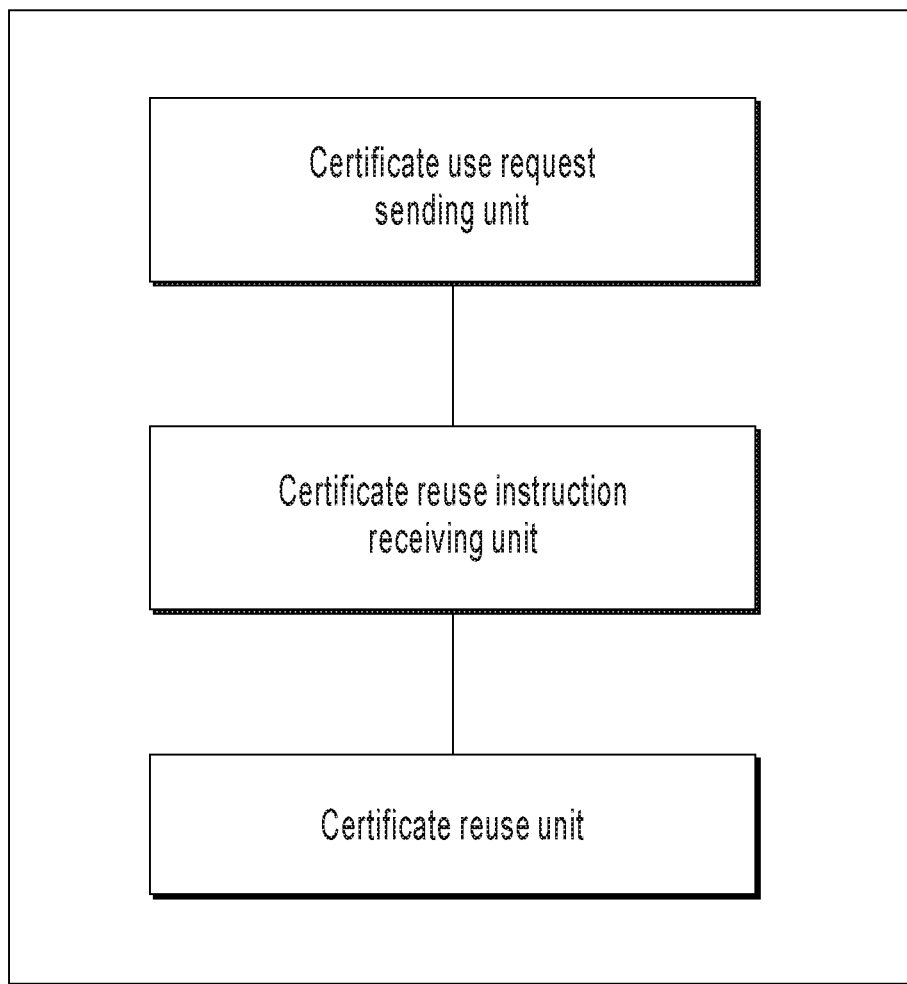
FIG. 9 is a diagram illustrating a logical structure of a digital certificate use implementation device applied to a client, according to an implementation of the present specification.

FIG. 9 shows a digital certificate use implementation device according to an implementation of the present specification. The device includes a certificate use request sending unit, a certificate reuse instruction receiving unit, and a certificate reuse unit. The certificate use request sending unit is configured to send a request for using a certificate to a server, where the request for using the certificate includes a device ID of client and an identity verification requirement of the certificate, and the identity verification requirement specifies at least one element identity verification method, so that the server searches, based on maintained mapping relationships between the device ID of the client, an ID of an existing certificate, and an identity verification method that has been used for the existing certificate, for an ID of an existing certificate, where the ID of the existing certificate corresponds to the device ID in the request for using the certificate, and identity verification methods that have been used for the existing certificate include each element identity verification method specified by the identity verification requirement. The certificate reuse instruction receiving unit is configured to receive a certificate use instruction from the server, where the certificate use instruction includes an ID of an existing certificate that satisfies the identity verification requirement. The certificate reuse unit is configured to perform signature by using a certificate with the ID of the existing certificate in the certificate use instruction.

In an implementation, the device can further include a to-be-upgraded identity verification method receiving unit, an upgraded certificate use instruction receiving unit, and an upgraded certificate use unit. The to-be-upgraded identity verification method receiving unit is configured to receive a to-be-upgraded identity verification method corresponding to at least one upgradable certificate ID from the server, where the upgradable certificate ID is an ID of an existing device that corresponds to the device ID, and at least one identity verification method that has been used for the upgradable certificate is the same as an element identity verification method, and the to-be-upgraded identity verification methods are all element identity verification methods different from the used identity verification method corresponding to the upgradable certificate ID. The upgraded certificate use instruction receiving unit is configured to receive a certificate use instruction from the server after identity authentication performed by using each to-be-upgraded identity verification method corresponding to an upgradable certificate ID is passed, where the certificate use instruction includes the upgradable certificate ID that satisfies the identity verification requirement. The upgraded certificate use unit is configured to perform signature by using a certificate with the upgradable certificate ID in the certificate use instruction.

In the implementation, the to-be-upgraded identity verification method receiving unit is specifically configured to receive a notification indicating that an existing certificate is upgradable from the server; send an acknowledgement for upgrading the existing certificate to the server after receiving a confirmation operation from a user; and receive a to-be-upgraded identity verification method corresponding to at least one upgradable certificate ID from the server.

In the implementation, the device can further include an upgradable certificate selection unit, configured to select one upgradable certificate ID when more than one upgradable certificate ID is received from the server, and perform identity authentication by using each to-be-upgraded identity verification method corresponding to the selected upgradable certificate ID.

In the implementation, the mapping relationships maintained by the server includes mapping relationships between a user ID, the device ID of the client, the ID of the existing certificate of the client, and the identity verification method that has been used for the existing certificate. The request for using the certificate further includes the user ID. The existing certificate ID corresponding to the device ID includes an existing certificate ID corresponding to the user ID and the device ID.

Optionally, the identity verification requirement includes at least one identity verification method set. Each identity verification method set specifies at least one element identity verification method. The at least one element identity verification method specified by the identity verification requirement includes all element identity verification methods specified by one identity verification method set in the identity verification requirement.

An implementation of the present specification provides a computer device, and the computer device includes a storage device and a processor. The storage device stores a computer program that can be run by the processor. When running the stored computer program, the processor performs the steps in the digital certificate application implementation method applied to the server in the implementation of the present specification. For detailed descriptions of the steps in the digital certificate application implementation method applied to the server, refer to the previously described content. Details are omitted for simplicity.

An implementation of the present specification provides a computer device, and the computer device includes a storage device and a processor. The storage device stores a computer program that can be run by the processor. When running the stored computer program, the processor performs the steps in the digital certificate use implementation method applied to the server in the implementation of the present specification. For detailed descriptions of the steps in the digital certificate use implementation method applied to the server, refer to the previously described content. Details are omitted for simplicity.

An implementation of the present specification provides a computer device, and the computer device includes a storage device and a processor. The storage device stores a computer program that can be run by the processor. When running the stored computer program, the processor performs the steps in the digital certificate use implementation method applied to the client in the implementation of the present specification. For detailed descriptions of the steps in the digital certificate use implementation method applied to the client, refer to the previously described content. Details are omitted for simplicity.

An implementation of the present specification provides a computer readable storage medium. The storage medium stores a computer program. When the computer program is run by a processor, the steps in the digital certificate application implementation method applied to the server in the implementation of the present specification are performed. For detailed descriptions of the steps in the digital certificate application implementation method applied to the server, refer to the previously described content. Details are omitted for simplicity.

An implementation of the present specification provides a computer readable storage medium. The storage medium stores a computer program. When the computer program is run by a processor, the steps in the digital certificate use implementation method applied to the server in the implementation of the present specification are performed. For detailed descriptions of the steps in the digital certificate use implementation method applied to the server, refer to the previously described content. Details are omitted for simplicity.

An implementation of the present specification provides a computer readable storage medium. The storage medium stores a computer program. When the computer program is run by a processor, the steps in the digital certificate use implementation method applied to the software client in the implementation of the present specification are performed. For detailed descriptions of the steps in the digital certificate use implementation method applied to the client, refer to the previously described content. Details are omitted for simplicity.

The previous descriptions are merely example implementations of the present specification, but are not intended to limit the present application. Any modification, equivalent replacement, or improvement made without departing from the spirit and principle of the present application should fall within the protection scope of the present application.

In a typical configuration, a computing device includes one or more central processing units (CPUs), an input/output interface, a network interface, and a memory.

The memory can take a form of a volatile memory, a random access memory (RAM), and/or a non-volatile memory in a computer readable medium, such as a read-only memory (ROM) or a flash RAM. The memory is an example of the computer readable medium.

The computer readable medium includes persistent, non-persistent, movable, and unmovable media that can store information by using any method or technology. The information can be a computer readable instruction, a data structure, a program module, or other data. Examples of the computer storage medium include but are not limited to a phase-change random access memory (PRAM), a static random access memory (SRAM), a dynamic random access memory (DRAM), another type of random access memory (RAM), a read-only memory (ROM), an electrically erasable programmable read-only memory (EEPROM), a flash memory or another memory technology, a compact disc read-only memory (CD-ROM), a digital versatile disc (DVD) or another optical storage, a cassette magnetic tape, a tape and disk storage or another magnetic storage device or any other non-transmission media that can be configured to store information that the computing device can access. As defined in the present specification, the computer readable medium does not include transitory media such as a modulated data signal and carrier.

It is worthwhile to note that the terms "include", "comprise", or their any other variants are intended to cover a non-exclusive inclusion, so a process, a method, an article, or a device that includes a list of elements not only includes those elements but also includes other elements that are not expressly listed, or further includes elements inherent to such a process, method, article, or device. An element preceded by "includes a . . . " does not, without more constraints, preclude the existence of additional identical elements in the process, method, article, or device that includes the element.

A person skilled in the art should understand that the implementations of the present specification can be provided as a method, a system, or a computer program product. Therefore, the implementations of the present specification can use hardware only implementations, software only implementations, or implementations with a combination of software and hardware. Moreover, the implementations of the present specification can use a computer program product that is implemented on one or more computer-usable storage media (including but not limited to a disk memory, a CD-ROM, an optical memory, etc.) that include computer-usable program code.

Figure 10:
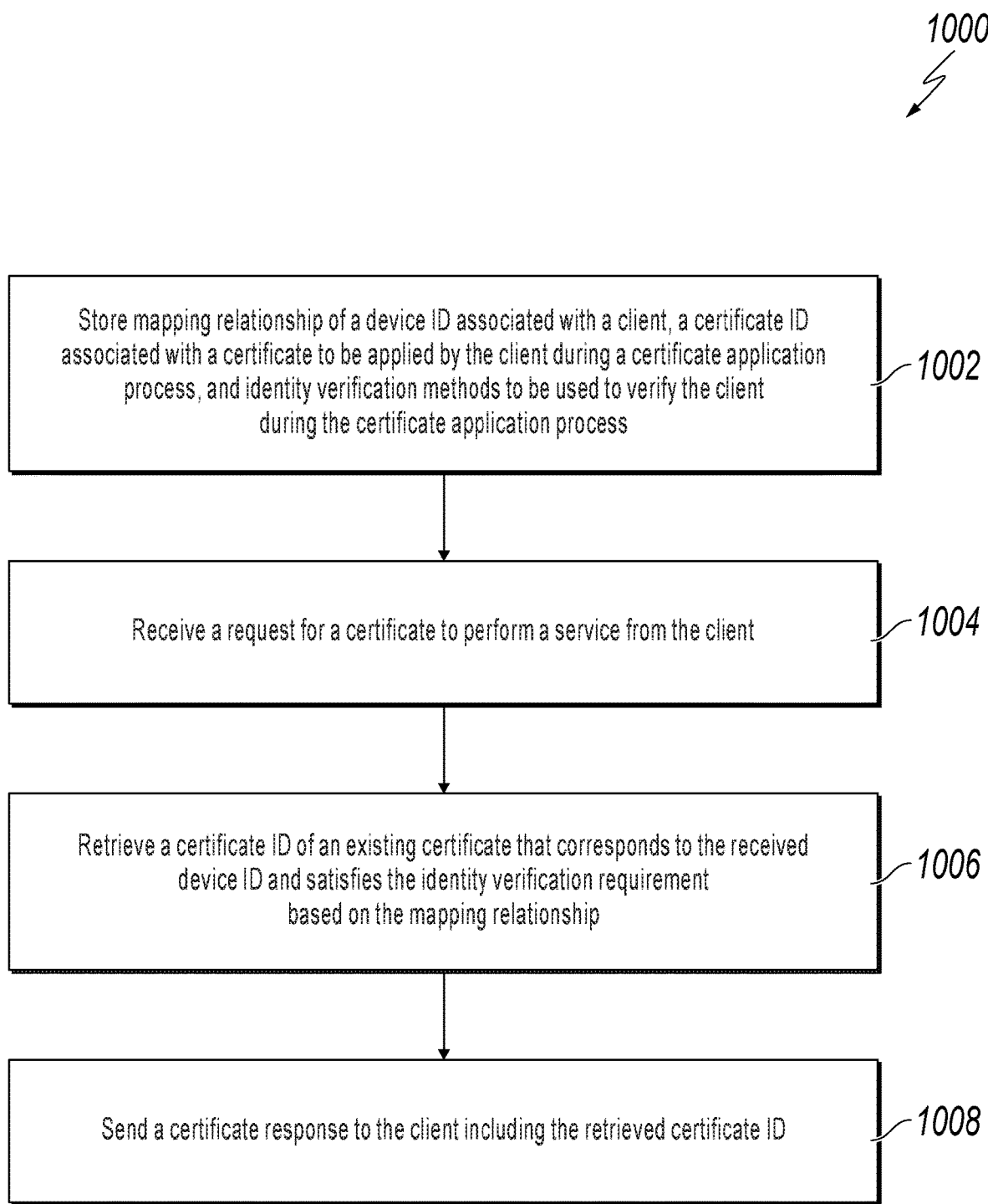
FIG. 10 is a flowchart illustrating an example of a computer-implemented method for requesting an issued digital certificate to perform a new service, according to an implementation of the present disclosure.

FIG. 10 is a flowchart illustrating an example of a computer-implemented method 1000 for requesting an issued digital certificate to perform a new service, according to an implementation of the present disclosure. For clarity of presentation, the description that follows generally describes method 1000 in the context of the other figures in this description. However, it will be understood that method 1000 can be performed, for example, by any system, environment, software, and hardware, or a combination of systems, environments, software, and hardware, as appropriate. In some implementations, various steps of method 1000 can be run in parallel, in combination, in loops, or in any order.

At 1002, a mapping relationship is stored including a device ID associated with a client, a certificate ID associated with a certificate to be applied by the client during a certificate application process, and identity verification methods to be used to verify the client during the certificate application process. After 1002, method 1000 proceeds to 1004.

At 1004, a request for a certificate to perform a service is received from the client. The request includes the device ID, an identification verification requirement associated with the service, and the identity verification requirement specifies at least one identity verification method.

After 1004, method 1000 proceeds to 1006.

At 1006, in response to receiving the request, based on the mapping relationship, a certificate ID of an existing certificate that corresponds to the received device ID and satisfies the identity verification requirement is retrieved. In some implementations, the retrieved certificate ID is configured to allow a user to sign a digital certificate signature.

In some implementations, the certificate ID of the existing certificate satisfies the identity verification requirement if the identity verification methods corresponding to the certificate ID include each element identity verification method specified by the identity verification requirement.

In some implementations, retrieving the certificate ID includes, identifying, based on the mapping relationship, an upgradeable certificate ID corresponding to the device ID and corresponding to at least one identity verification method specified in the request; identifying, based on the mapping relationship, at least one to-be-upgraded identity verification method corresponding to the upgradeable certificate ID and not specified in the request; and verifying the client using the to-be-upgraded identity verification methods. In some implementations, the certificate response includes the upgradeable certificate ID.

In some implementations, in response to verifying the client, the to-be-upgraded identity verification method is added to the identity verification methods corresponding to the upgradeable certificate ID in the mapping relationship. After 1006, method 1000 proceeds to 1008.

In some implementations, prior to storing the mapping relationship, a new certificate request including the device ID and the identity verification requirement is received from the client; the client using each identity verification method specified by the identity verification requirement is verified; and in response verifying the client, the certificate to the client is issued. In some implementations, storing the mapping relationship includes storing the certificate ID associated with the issued certificate, the received device ID, and the identity verification methods specified by the received identity verification requirement. In some implementations, the new certificate request is received in response to sending an indication to the client that no certificate ID matches the received request. After 1008, method 1000 stops.

Implementations of the present application can solve technical problems of how to use a small number of digital certificate to satisfy various security requirements of different services. Different services can have different security requirements, and each APP installed on a device may have a plurality of digital certificates with different credibility. Therefore, a user may apply for a new certificate and repeat authentication that she has passed previously each time when performing a new service. A technique to bypass these problems in the conventional methods may provide a more efficient and secured solution.

Implementations of the present application provide method and apparatus for improving digital certificate application and usage. In some implementations, the server extracts the device ID and the identity verification requirement of the certificate from the certificate application request, issues the certificate after the client passes the identity authentication performed by using each element identity verification method, and stores the mapping relationships between the device ID, the ID of the certificate, and the identity verification method that has been used. Later, when the server receives a request for a certificate to perform a service, it searches, based on an element identity verification method specified by an identity verification requirement of a certificate that is sent by client, existing certificates of a device that the client is located on for an existing certificate ID that satisfies the identity verification requirement, and instructs the client to use the existing certificate that satisfies the identity verification requirement. As such, the existing certificate can be reused for several services while satisfying service requirements. Such techniques may reduce the number of certificates saved on the client and also may reduce certificate application operations of a user.

Embodiments and the operations described in this specification can be implemented in digital electronic circuitry, or in computer software, firmware, or hardware, including the structures disclosed in this specification or in combinations of one or more of them. The operations can be implemented as operations performed by a data processing apparatus on data stored on one or more computer-readable storage devices or received from other sources. A data processing apparatus, computer, or computing device may encompass apparatus, devices, and machines for processing data, including by way of example a programmable processor, a computer, a system on a chip, or multiple ones, or combinations, of the foregoing. The apparatus can include special purpose logic circuitry, for example, a central processing unit (CPU), a field programmable gate array (FPGA) or an application-specific integrated circuit (ASIC). The apparatus can also include code that creates an execution environment for the computer program in question, for example, code that constitutes processor firmware, a protocol stack, a database management system, an operating system (for example an operating system or a combination of operating systems), a cross-platform runtime environment, a virtual machine, or a combination of one or more of them. The apparatus and execution environment can realize various different computing model infrastructures, such as web services, distributed computing and grid computing infrastructures.

A computer program (also known, for example, as a program, software, software application, software module, software unit, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A program can be stored in a portion of a file that holds other programs or data (for example, one or more scripts stored in a markup language document), in a single file dedicated to the program in question, or in multiple coordinated files (for example, files that store one or more modules, sub-programs, or portions of code). A computer program can be executed on one computer or on multiple computers that are located at one site or distributed across multiple sites and interconnected by a communication network.

Processors for execution of a computer program include, by way of example, both general- and special-purpose microprocessors, and any one or more processors of any kind of digital computer. Generally, a processor will receive instructions and data from a read-only memory or a random-access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data. A computer can be embedded in another device, for example, a mobile device, a personal digital assistant (PDA), a game console, a Global Positioning System (GPS) receiver, or a portable storage device. Devices suitable for storing computer program instructions and data include non-volatile memory, media and memory devices, including, by way of example, semiconductor memory devices, magnetic disks, and magneto-optical disks. The processor and the memory can be supplemented by, or incorporated in, special-purpose logic circuitry.

Mobile devices can include handsets, user equipment (UE), mobile telephones (for example, smartphones), tablets, wearable devices (for example, smart watches and smart eyeglasses), implanted devices within the human body (for example, biosensors, cochlear implants), or other types of mobile devices. The mobile devices can communicate wirelessly (for example, using radio frequency (RF) signals) to various communication networks (described below). The mobile devices can include sensors for determining characteristics of the mobile device's current environment. The sensors can include cameras, microphones, proximity sensors, GPS sensors, motion sensors, accelerometers, ambient light sensors, moisture sensors, gyroscopes, compasses, barometers, fingerprint sensors, facial recognition systems, RF sensors (for example, Wi-Fi and cellular radios), thermal sensors, or other types of sensors. For example, the cameras can include a forward- or rear-facing camera with movable or fixed lenses, a flash, an image sensor, and an image processor. The camera can be a megapixel camera capable of capturing details for facial and/or iris recognition. The camera along with a data processor and authentication information stored in memory or accessed remotely can form a facial recognition system. The facial recognition system or one-or-more sensors, for example, microphones, motion sensors, accelerometers, GPS sensors, or RF sensors, can be used for user authentication.

To provide for interaction with a user, embodiments can be implemented on a computer having a display device and an input device, for example, a liquid crystal display (LCD) or organic light-emitting diode (OLED)/virtual-reality (VR)/augmented-reality (AR) display for displaying information to the user and a touchscreen, keyboard, and a pointing device by which the user can provide input to the computer. Other kinds of devices can be used to provide for interaction with a user as well; for example, feedback provided to the user can be any form of sensory feedback, for example, visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments can be implemented using computing devices interconnected by any form or medium of wireline or wireless digital data communication (or combination thereof), for example, a communication network. Examples of interconnected devices are a client and a server generally remote from each other that typically interact through a communication network. A client, for example, a mobile device, can carry out transactions itself, with a server, or through a server, for example, performing buy, sell, pay, give, send, or loan transactions, or authorizing the same. Such transactions may be in real time such that an action and a response are temporally proximate; for example an individual perceives the action and the response occurring substantially simultaneously, the time difference for a response following the individual's action is less than 1 millisecond (ms) or less than 1 second (s), or the response is without intentional delay taking into account processing limitations of the system.

Examples of communication networks include a local area network (LAN), a radio access network (RAN), a metropolitan area network (MAN), and a wide area network (WAN). The communication network can include all or a portion of the Internet, another communication network, or a combination of communication networks. Information can be transmitted on the communication network according to various protocols and standards, including Long Term Evolution (LTE), 5G, IEEE 802, Internet Protocol (IP), or other protocols or combinations of protocols. The communication network can transmit voice, video, biometric, or authentication data, or other information between the connected computing devices.

Features described as separate implementations may be implemented, in combination, in a single implementation, while features described as a single implementation may be implemented in multiple implementations, separately, or in any suitable sub-combination. Operations described and claimed in a particular order should not be understood as requiring that the particular order, nor that all illustrated operations must be performed (some operations can be optional). As appropriate, multitasking or parallel-processing (or a combination of multitasking and parallel-processing) can be performed.

What is claimed is:

1. A computer-implemented method, comprising:
    storing a mapping relationship of a device identifier (ID) associated with a client, a certificate ID associated with a certificate to be applied by the client during a certificate application process, and identity verification methods to be used to verify the client during the certificate application process;
    receiving, from the client, a request for a certificate to perform a service, wherein the request includes the device ID, an identification verification requirement associated with the service, wherein the identity verification requirement specifies at least one identity verification method;
    in response to receiving the request, identifying, based on the mapping relationship, an upgradeable certificate ID corresponding to the device ID and corresponding to the at least one identity verification method specified in the request;
    identifying, based on the mapping relationship, at least one to-be-upgraded identity verification method corresponding to the upgradeable certificate ID and not specified in the request;
    verifying the client using the at least one to-be-upgraded identity verification method;
    in response to verifying the client, adding the at least one to-be-upgraded identity verification method to the identity verification methods corresponding to the upgradeable certificate ID in the mapping relationship; and
    sending a certificate response to the client including the upgradeable certificate ID.

2. The computer-implemented method of claim 1, wherein the upgradeable certificate ID is configured to allow a user to sign a digital certificate signature.

3. The computer-implemented method of claim 1, further comprising:
    retrieving, based on the mapping relationship, a certificate ID of an existing certificate that corresponds to the received device ID and satisfies the identity verification requirement, wherein the certificate ID of the existing certificate satisfies the identity verification requirement if the identity verification methods corresponding to the certificate ID include each element identity verification method specified by the identity verification requirement.

4. The computer-implemented method of claim 1, further comprising:
    prior to storing the mapping relationship:
        receiving, from the client, a new certificate request including the device ID and the identity verification requirement;
        verifying the client using each identity verification method specified by the identity verification requirement; and
        in response verifying the client, issuing the certificate to the client;
    wherein storing the mapping relationship includes storing the certificate ID associated with the issued certificate, the received device ID, and the identity verification methods specified by the received identity verification requirement.

5. The computer-implemented method of claim 4, wherein the new certificate request is received in response to sending an indication to the client that no certificate ID matches the received request.

6. A non-transitory, computer-readable medium storing one or more instructions executable by a computer system to perform operations comprising:
    storing a mapping relationship of a device identifier (ID) associated with a client, a certificate ID associated with a certificate to be applied by the client during a certificate application process, and identity verification methods to be used to verify the client during the certificate application process;
    receiving, from the client, a request for a certificate to perform a service, wherein the request includes the device ID, an identification verification requirement associated with the service, wherein the identity verification requirement specifies at least one identity verification method;
    in response to receiving the request, identifying, based on the mapping relationship, an upgradeable certificate ID corresponding to the device ID and corresponding to the at least one identity verification method specified in the request;
    identifying, based on the mapping relationship, at least one to-be-upgraded identity verification method corresponding to the upgradeable certificate ID and not specified in the request;
    verifying the client using the at least one to-be-upgraded identity verification method;
    in response to verifying the client, adding the at least one to-be-upgraded identity verification method to the identity verification methods corresponding to the upgradeable certificate ID in the mapping relationship; and
    sending a certificate response to the client including the upgradeable certificate ID.

7. The non-transitory, computer-readable medium of claim 6, wherein the upgradeable certificate ID is configured to allow a user to sign a digital certificate signature.

8. The non-transitory, computer-readable medium of claim 6, further comprising:
    retrieving, based on the mapping relationship, a certificate ID of an existing certificate that corresponds to the received device ID and satisfies the identity verification requirement, wherein the certificate ID of the existing certificate satisfies the identity verification requirement if the identity verification methods corresponding to the certificate ID include each element identity verification method specified by the identity verification requirement.

9. The non-transitory, computer-readable medium of claim 6, further comprising:
    prior to storing the mapping relationship:
        receiving, from the client, a new certificate request including the device ID and the identity verification requirement;

verifying the client using each identity verification method specified by the identity verification requirement; and in response verifying the client, issuing the certificate to the client;

wherein storing the mapping relationship includes storing the certificate ID associated with the issued certificate, the received device ID, and the identity verification methods specified by the received identity verification requirement.

10. The non-transitory, computer-readable medium of claim 9, wherein the new certificate request is received in response to sending an indication to the client that no certificate ID matches the received request.

11. A computer-implemented system, comprising:
one or more computers; and
one or more computer memory devices interoperably coupled with the one or more computers and having tangible, non-transitory, machine-readable media storing one or more instructions that, when executed by the one or more computers, perform one or more operations comprising:
storing a mapping relationship of a device identifier (ID) associated with a client, a certificate ID associated with a certificate to be applied by the client during a certificate application process, and identity verification methods to be used to verify the client during the certificate application process;
receiving, from the client, a request for a certificate to perform a service, wherein the request includes the device ID, an identification verification requirement associated with the service, wherein the identity verification requirement specifies at least one identity verification method;
in response to receiving the request, identifying, based on the mapping relationship, an upgradeable certificate ID corresponding to the device ID and corresponding to the at least one identity verification method specified in the request;
identifying, based on the mapping relationship, at least one to-be-upgraded identity verification method corresponding to the upgradeable certificate ID and not specified in the request;
verifying the client using the at least one to-be-upgraded identity verification method;
in response to verifying the client, adding the at least one to-be-upgraded identity verification method to the identity verification methods corresponding to the upgradeable certificate ID in the mapping relationship; and
sending a certificate response to the client including the upgradeable certificate ID.

12. The computer-implemented system of claim 11, wherein the upgradeable certificate ID is configured to allow a user to sign a digital certificate signature.

13. The computer-implemented system of claim 11, further comprising:
retrieving, based on the mapping relationship, a certificate ID of an existing certificate that corresponds to the received device ID and satisfies the identity verification requirement, wherein the certificate ID of the existing certificate satisfies the identity verification requirement if the identity verification methods corresponding to the certificate ID include each element identity verification method specified by the identity verification requirement.

14. The computer-implemented system of claim 11, further comprising:
prior to storing the mapping relationship:
receiving, from the client, a new certificate request including the device ID and the identity verification requirement;
verifying the client using each identity verification method specified by the identity verification requirement; and
in response verifying the client, issuing the certificate to the client;
wherein storing the mapping relationship includes storing the certificate ID associated with the issued certificate, the received device ID, and the identity verification methods specified by the received identity verification requirement.

* * * * *

UNITED STATES PATENT AND TRADEMARK OFFICE
CERTIFICATE OF CORRECTION

PATENT NO.         : 10,904,241 B2
APPLICATION NO.    : 16/723015
DATED              : January 26, 2021
INVENTOR(S)        : Yawen Wei Page 1 of 1

It is certified that error appears in the above-identified patent and that said Letters Patent is hereby corrected as shown below:

On the Title Page

Column 1, Line 3, related U.S. Application Data, below "Oct. 26, 2018." Insert item -- (30) Foreign Application Priority Data Oct. 30, 2017 (CN) ............201711036776.9 --.

In the Claims

Column 24, Line 4, in Claim 4, after "response" insert -- to --.

Column 25, Line 4, in Claim 9, after "response" insert -- to --.

Column 26, Line 34, in Claim 14, after "response" insert -- to --.

Signed and Sealed this
Thirteenth Day of April, 2021

Drew Hirshfeld
*Performing the Functions and Duties of the
Under Secretary of Commerce for Intellectual Property and
Director of the United States Patent and Trademark Office*